United States Patent
Rama (10) Patent No.: US 9,754,305 B2
(45) Date of Patent: Sep. 5, 2017

(54) ORDER UPSELL-OPTIONS FOR A CONFIGURABLE PRODUCT

(71) Applicant: Dell Products L.P., Round Rock, TX (US)

(72) Inventor: Kiran Rama, Bangalore (IN)

(73) Assignee: Dell Products L.P., Round Rock, TX (US)

(*) Notice: Subject to any disclaimer, the term of this patent is extended or adjusted under 35 U.S.C. 154(b) by 1102 days.

(21) Appl. No.: 13/622,591

(22) Filed: Sep. 19, 2012

(65) Prior Publication Data

US 2014/0081810 A1    Mar. 20, 2014

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0641* (2013.01)

(58) Field of Classification Search
CPC .............. G06Q 30/0631; G06Q 30/0641
USPC .................................. 705/26, 27
See application file for complete search history.

(56) References Cited

U.S. PATENT DOCUMENTS

| | | | | |
|---|---|---|---|---|
| 7,505,921 | B1* | 3/2009 | Lukas ............... | G06Q 30/0603 705/26.5 |
| 2004/0267676 | A1* | 12/2004 | Feng .................. | G06Q 30/0283 705/400 |
| 2007/0033098 | A1* | 2/2007 | Peters .................... | G06Q 30/02 705/14.25 |
| 2010/0235206 | A1* | 9/2010 | Miller ................. | G06Q 10/063 705/7.11 |
| 2013/0246581 | A1* | 9/2013 | Crawford, Jr. ......... | G06Q 30/02 709/219 |

OTHER PUBLICATIONS

Ghost, Bikram P.: "Essays on Cross-Selling, Bundling, and Customer Retention," UMI, Dec. 2006 ProQuest Dialog, 144pgs.*
Cashin, Jeffrey R.: "Implementation of a cross-selling strategy for a large Midwestern healthcare company," UMI, Feb. 2003, ProQuest Dialog, 168pgs.*

* cited by examiner

*Primary Examiner* — Rob Pond
(74) *Attorney, Agent, or Firm* — Terrile, Cannatti, Chambers & Holland LLP; Stephen A. Terrile (57) ABSTRACT

A system, method, and computer-readable medium are disclosed for managing the display of product module descriptors within a user interface. Product module data, along with historical visit and product module purchase data, is processed to generate a Config Score numeric value, which in turn is processed to generate a ConfigRank numeric value for each of a plurality of product modules. In turn, the ConfigRank numeric values are then used to determine the placement of each product module's associated product module descriptor within a user interface window.

18 Claims, 5 Drawing Sheets

| Original Ordering Of Product Module Descriptors | Product Module Descriptor | Upsell Hit Pct. Rank | Upsell Revenue per Upsell Hit Num Rank | Config Rank |
|---|---|---|---|---|
| 1 | CPU | 11% | $345.90 | 1 |
| 2 | Operating System | 15% | $200.70 | 5 |
| 3 | Case Color | 1% | $90.00 | 19 |
| 4 | Memory | 37% | $174.50 | 4 |
| 5 | Hard Drive | 8% | $516.10 | 6 |
| 6 | LCD Screen | 25% | $241.40 | 2 |
| 7 | Graphics Card | 0% | $178.00 | 14 |
| 8 | Optical Drive | 41% | $73.90 | 8 |
| 9 | Office Software | 29% | $275.60 | 3 |
| 10 | Battery | 17% | $85.80 | 9 |
| 11 | Security Software | 0% | $189.50 | 18 |
| 12 | TV Tuner | 6% | $100.30 | 10 |

Figure 5b

| Ranked Ordering Of Product Module Descriptors | Product Module Descriptor | Upsell Hit Pct. | Upsell Revenue per Upsell Hit Num Rank | Config Rank |
|---|---|---|---|---|
| 1 | CPU | 11% | $345.90 | 1 |
| 2 | LCD Screen | 25% | $241.40 | 2 |
| 3 | Office Software | 29% | $275.60 | 3 |
| 4 | Memory | 37% | $174.50 | 4 |
| 5 | Operating System | 15% | $200.70 | 5 |
| 6 | Hard Drive | 8% | $516.10 | 6 |
| 7 | Optical Drive | 41% | $73.90 | 8 |
| 8 | Battery | 17% | $85.80 | 9 |
| 9 | TV Tuner | 6% | $100.30 | 10 |
| 10 | Graphics Card | 0% | $178.00 | 14 |
| 11 | Security Software | 0% | $189.50 | 18 |
| 12 | Case Color | 1% | $90.00 | 19 |

ORDER UPSELL-OPTIONS FOR A CONFIGURABLE PRODUCT

BACKGROUND OF THE INVENTION

Field of the Invention

The present invention relates to the management of information handling systems. More specifically, embodiments of the invention provide a system, method, and computer-readable medium for managing the display of product module descriptors within a user interface.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce (ecommerce) on the Internet. However, users of ecommerce sites are sometimes challenged when navigating a complex site, particularly if the information they are seeking requires multiple clicks or other user gestures. In response, vendors have increasingly used product configurators to assist buyers in configuring a product from many different options, or modules.

One example of a configurable product is a personal computer. Another is a television, with options to choose the type of service, mounting stand, media player, direct-to-home (DTH) satellite service, etc. However, vendors are often faced with two challenges. The first is determining which options should be displayed to the customer. As an example, a vendor may have 50 or more modules that could be displayed. The second challenge is determining the optimal order in which the selected modules are displayed. This is an important consideration, as options that are presented at the top or beginning of a list typically receive higher numbers of user interactions than those presented at the bottom or end. For example, is presenting a processor option followed by a memory option the optimal order or is it vice-versa?

However, current approaches to these issues are typically based upon the intuition of merchandising and business managers. Furthermore, few approaches to addressing these issues are based upon the behavioral data of online visitors. Those that do exist typically rely upon analysis of sales data.

SUMMARY OF THE INVENTION

A system, method, and computer-readable medium are disclosed for managing the display of product module descriptors within a user interface. In various embodiments, product module ranking operations are performed to generate a numeric ranking value, referred to herein as "ConfigRank," for a predetermined product module. In these and other embodiments, the ConfigRank numeric value corresponds to the proposed order of a module in the configurator taking the upsell propensity of module, revenue from module into account.

In various embodiments, product module ranking operations are performed by processing product module data, along with historical visit and product module purchase data, to generate a Hit Num Rank numeric value, an Upsell Hit Num Rank numeric value, an upsell Hit Pct Rank value, and an Upsell Revenue per Upsell Hit Num Rank numeric value as described in greater detail herein, for a plurality of product modules. A Config Score numeric value, as likewise described in greater detail herein, is then generated for each of the product modules from the sum of their resulting Hit Num Rank, Upsell Hit Num Rank, upsell Hit Pct Rank, and Upsell Revenue per Upsell Hit Num Rank numeric values.

In turn, the resulting Config Score numeric values are processed to generate ConfigRank business rules, which are then used to generate a ConfigRank numeric value for each of the product modules. The ConfigRank numeric values are then used to determine the placement of each product module's product module descriptor within a user interface window.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for managing the display of product module descriptors within a user interface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
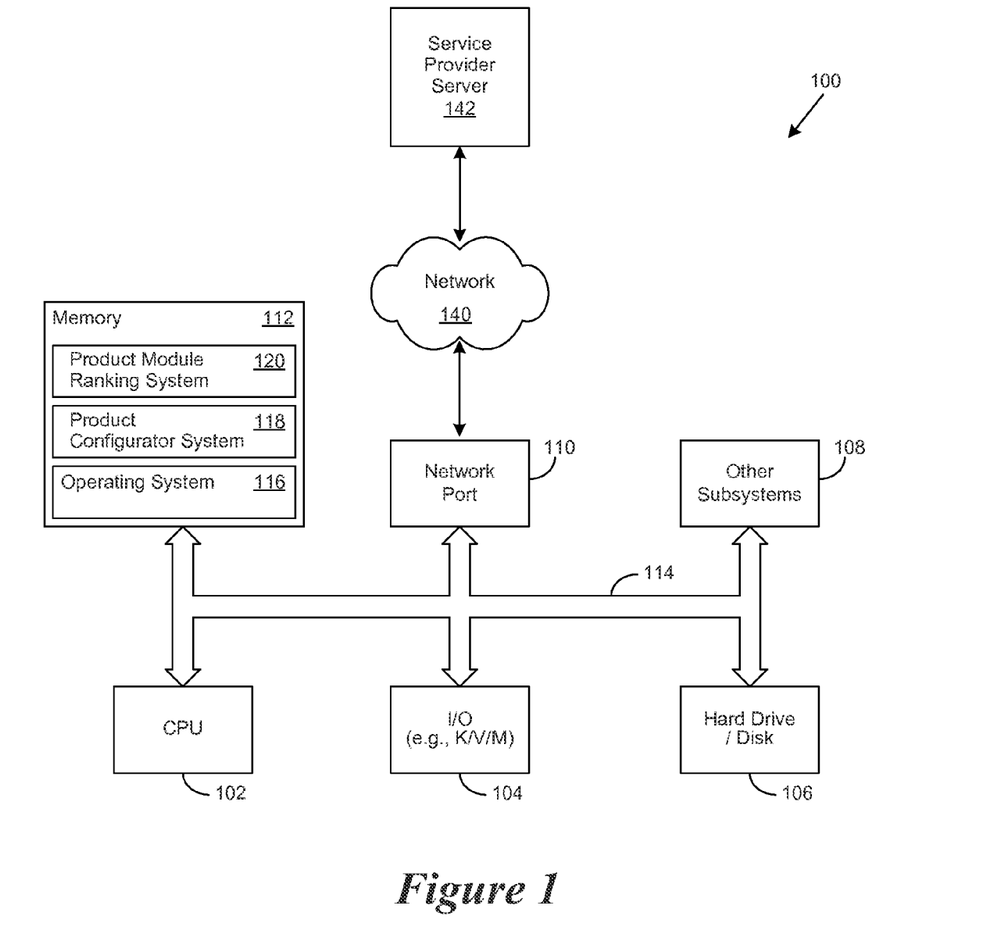
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a product configurator system 118, a product module ranking system 120, or both. In one embodiment, the information handling system 100 is able to download the product configurator system 118, the product module ranking system 120, or both, from the service provider server 142. In another embodiment, the product configurator system 118, the product module ranking system 120, or both, is provided as a service from the service provider server 142.

Figure 2:
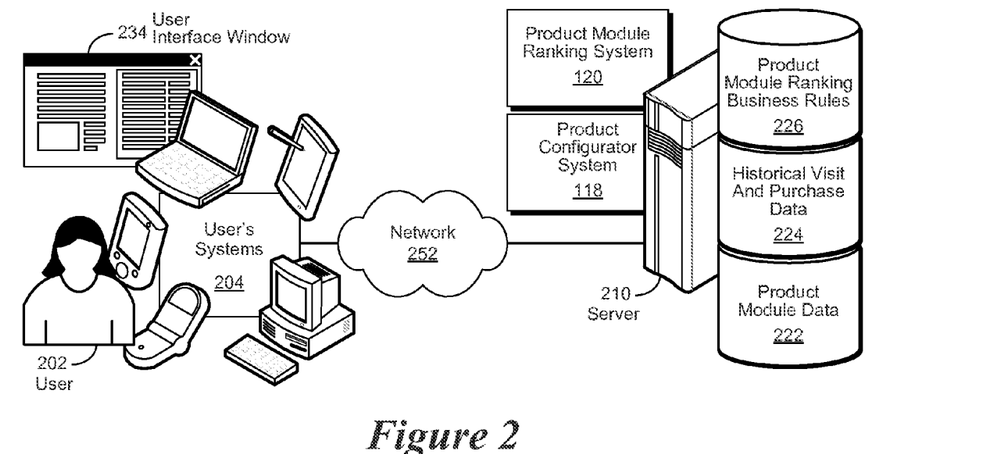
FIG. 2 is a simplified block diagram of a product module ranking system.

FIG. 2 is a simplified block diagram of a product module ranking system implemented in accordance with an embodiment of the invention. In various embodiments, product module ranking operations are performed to generate a numeric ranking value, referred to herein as "ConfigRank," for a predetermined product module. In one embodiment, the ConfigRank numeric value corresponds to the value of the revenue generated from the sale of an associated product module.

As used herein, a product module broadly refers to any aspect of a product or service that can be configured, modified, upgraded, downgraded, extended, installed, removed, deleted or otherwise applied to change a default composition of the product or service. As an example, a prospective customer may visit a web site with the intent of purchasing a laptop computer. A laptop model is selected that has a base configuration. The prospective customer may then elect to upgrade the laptop with various product modules, such as a faster processor, additional Random Access Memory (RAM), a larger hard drive, or an optical drive, each of which has a corresponding upcharge. To further the example, the base configuration of the laptop may include an extended service plan module, which the prospective customer may elect to delete. As a result, its corresponding cost is deleted, lowering the base cost of the laptop.

In these and other embodiments, the ConfigRank numeric value is used to determine the placement of a plurality of product module descriptors, each of which is respectively associated with a corresponding product module, within a user interface (UI) window. As used herein, a product module descriptor broadly refers to data, or metadata, associated with a product module. In various embodiments, such data or metadata may be represented within a UI window in textual, graphical or video form.

As an example, a plurality of product module descriptors may each comprise a line of text corresponding to its associated product module, which in turn has a ConfigRank numeric value. In this example, a list of the individual product module descriptors is displayed within the UI window, with each line of text respectively corresponding to a product module. The order in which the product module descriptors are displayed is determined by the ConfigRank numeric value corresponding to each associated product module.

As another example, a product module may be represented by a product module descriptor in the form of a graphical icon. In this example, the placement of the product module descriptors, and the order in which they appear, is determined by the ConfigRank numeric value of their associated product modules. To further this example, the graphical icons may be sequentially displayed to preferentially draw the user's attention to a predetermined product descriptor. As yet another example, the product module descriptors may comprise streaming video clips, each of which runs within its respective window within the UI window when invoked by the user. Skilled practitioners of the art will recognize that there are many such examples of product modules and product module descriptors and that the foregoing is not intended to limit the spirit, scope or intent of the invention.

In various embodiments, the lower the numeric value of a product module's ConfigRank numeric value, the more placement priority its associated product module descriptor would receive within a UI. As an example, the product module descriptor associated with a product module that has a ConfigRank numeric value of '1' would receive placement priority over a product module descriptor associated with a product module that has a ConfigRank numeric value of '5'. Likewise, a product module descriptor associated with a product module that has a ConfigRank numeric value of '5' would receive placement priority over a product module descriptor associated with a product module that has a ConfigRank numeric value of '9'.

In these and other embodiments, the ConfigRank numeric value is used to determine the respective location of individual product module descriptors within a UI window. As an example, product module descriptors may be displayed as a list within a UI window. To further the example, those product module descriptors associated with a product module that have a low ConfigRank numeric value may be displayed towards the top of the list, while those associated with product modules that have a high ConfigRank numeric value may be displayed towards the bottom. As another example, the product module descriptors may be displayed in different locations within the UI window, with product module descriptor associated with product modules having a low ConfigRank numeric value being displayed in a more prominent location. As yet another example, various visual attributes may be applied to product module descriptors according to the ConfigRank numeric value of their associated product modules. To further this example, a product module descriptor that comprises text may have a 'bold' attribute applied to the text if it is associated with a product module that has a low ConfigRank numeric value. Those of skill in the art will recognized that many such examples are possible and that the foregoing is not intended to limit the spirit, scope or intent of the invention.

In various embodiments, a product module ranking system 120 is implemented to perform the aforementioned product module ranking operations that result in the generation of a ConfigRank numeric value for a product module. In these and other embodiments, the product module ranking system 120 comprises a repository of product module data 222, a repository of historical visit and purchase data 224, and a repository of product module ranking business rules 226. In these and other embodiments, the product module ranking system 120 may be implemented on one or more servers 210, which are connected to a network 252. In certain of these embodiments, the product module ranking system 120 may be implemented in conjunction with a product configurator system 118, familiar to those of skill in the art, which is likewise implemented on one or more servers 210 connected to a network 252. In various embodiments, the network 252 may comprise a public network, such as the Internet, a physical private network, a virtual private network (VPN), or any combination thereof.

Referring now to FIG. 2, product module ranking operations are initiated by the product module ranking system 120 receiving product module data along with associated historical site visit and product module purchase data. In various embodiments, the product module data comprises data associated with the product module (e.g., product details, price, etc.). In certain of these embodiments, the product module data comprises associated product module descriptor data. In these and other embodiments, the product module data may include location data associated with the current location of various product module descriptors within a UI window.

In these various embodiments, the historical site visit data comprises user clickstream data familiar to those of skill in the art. In certain of these embodiments, the product module data is stored in the repository of product module data 222, and the historical site visit and product module purchase data is stored in the repository of historical site visit and product module purchase data 224.

The product module data and the historical visit and product module purchase data are then processed to generate a Hit Num Rank numeric value, an Upsell Hit Num Rank numeric value, an upsell Hit Pct Rank value, and an Upsell Revenue per Upsell Hit Num Rank numeric value as described in greater detail herein. The resulting Hit Num Rank, Upsell Hit Num Rank, upsell Hit Pct Rank, and Upsell Revenue per Upsell Hit Num Rank numeric values are then processed in step to generate a Config Score numeric value, as likewise described in greater detail herein.

In turn, the Hit Num Rank, Upsell Hit Num Rank, upsell Hit Pct Rank, and Upsell Revenue per Upsell Hit Num Rank numeric values and the resulting Config Score numeric value are processed to generate ConfigRank business rules. In various embodiments, the ConfigRank business rules are stored in the repository of product module ranking and business rules 226, which are then used to generate a ConfigRank numeric value. In turn, the ConfigRank numeric value is then used, as described in greater detail herein, to determine the placement of product module descriptors within a user interface window 234 of a user's system 204. As used herein, the user's system 204 may comprise a personal computer, a laptop computer, a tablet computer, a personal digital assistant (PDA), a mobile telephone, or any other suitable device operable to establish an on-line session with the product module ranking system 120 over a connection to network 252.

From the foregoing, it will be apparent to skilled practitioners of the art that using a ConfigRank numeric value to determine the placement of a product module descriptor within a UI may result in greater revenue being generated for its associated product module. As an example, a product module descriptor placed at the top or beginning of a list may receive a higher numbers of clicks than one at the bottom or end of the list.

Figure 3:
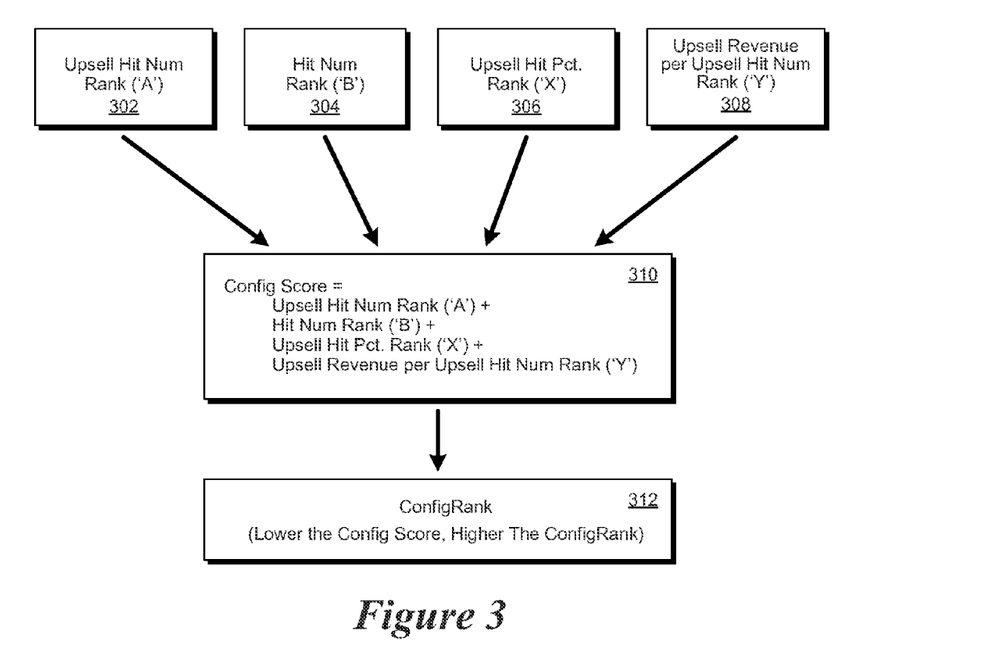
FIG. 3 is a simplified block diagram of the performance of product module ranking operations to generate a product module ranking value.

FIG. 3 is a simplified block diagram of product module ranking operations performed in accordance with an embodiment of the invention to generate a product module ranking value. In this embodiment, a product module ranking value, referred to herein as "ConfigRank," is generated from four product module metrics.

The first of these four metrics is a Upsell Hit Num Rank ('A') 302, which is defined herein as the total number of 'clicks' on a product module descriptor that are associated with a purchase of its associated product module. As used herein, a user 'click' broadly refers to a user interaction with a product module descriptor. Examples of such user interactions include mouse clicks, mouse hovers, tap operations performed with a user's fingertip on a touch-sensitive screen, and other user gestures familiar to those of skill in the art.

In various embodiments, the number of such user clicks may be spread across a number of different visitors to a web site. As an example, a product module descriptor may receive 100 user clicks, but not all of them may result in the purchase, or upsell, of its associated product module. To further the example, a product module descriptor for a memory upgrade may receive a total of 100 user clicks from 67 visitors to a site. However, only 33 of the clicks are associated with the eventual purchase, or upsell, of the upgrade by 20 of the visitors. In this example, the 33 clicks resulting in the 20 instances of an upsell would be called "upsell hits." In various embodiments, Upsell Hit Num Rank ('A') 302 represents "Supply."

The second of the four metrics is Hit Num Rank ('B') 304, which is defined herein as the total number of user clicks on the product module descriptor associated with a product module, regardless of whether or not any of the clicks are associated with the purchase, or upsell, of the product module. In certain embodiments, the Hit Num Rank ('B') 304 may also include any user click used to move to the next product module descriptor within the UI window.

The third of the four metrics is Upsell Hit Pct. Rank ('X') 306, which is defined herein as the percentage of total user clicks on a product module descriptor that are associated with the purchase, or upsell, of its associated product module. In various embodiments, the value of Upsell Hit Pct. Rank ('X') 306 for a predetermined product module is determined by dividing the Hit Num Rank ('B') 304 by the Upsell Hit Num Rank ('A') 302.

The fourth metric is Upsell Revenue per Upsell Hit Num Rank ('Y') 308, which is defined herein as the total amount of revenue generated by the purchase, or upsell, of a product module divided by its associated Upsell Hit Num Rank ('A') 302. As an example, a 4 GB memory upgrade is offered for $99.00, which receives a total of 33 clicks on its associated product module descriptor from 20 visitors who decide to purchase the memory upgrade. The resulting total revenue for the product module is $1,980.00 (i.e., 20 visitors×$99.00). This amount is then divided by the Upsell Hit Num Rank ('A') 302 (i.e., 33 clicks), which results in an Upsell Revenue per Upsell Hit Num Rank ('Y') 308 of $60.00. In various embodiments, Upsell Revenue per Upsell Hit Num Rank ('Y') 308 represents "Demand." It will be apparent to those of skill in the art that the invention disclosed herein provides an approach to match "Supply" (Upsell Hit Num Rank ('A'), which are the number of clicks on a product module descriptor, with "Demand" (Upsell Revenue per Upsell Hit Num Rank ('Y') 308), which are the product modules that have the highest purchase propensity.

Referring now to FIG. 3, a ConfigScore is generated in Block 310 from the sum of Upsell Hit Num Rank ('A') 302, Hit Num Rank ('B') 304 Upsell Hit Pct. Rank ('X') 306, and Upsell Revenue per Upsell Hit Num Rank ('Y') 308. From the foregoing, it will be apparent to those of skill in the art that a high numeric value for each of the four metrics 302, 304, 306, 308 will result in a correspondingly high numeric value for the resulting Config Score numeric value. For example:

If A=1, B=1, X=1 and Y=1, then Config Score numeric value=4
which represents a higher rank than when:
A=1, B=2, X=2, Y=2, where Config Score numeric value=7
Likewise:
If A=1, B=2, X=2 and Y=2, then Config Score numeric value=7
which represents a higher rank than when:
A=2, B=2, X=2, Y=2, where Config Score numeric value=8

In various embodiments, the resulting Config Score numeric value is processed in Block 312 to generate a ConfigRank numeric value, which in various embodiments, is used to determine the placement of a plurality of product module descriptors, each of which is respectively associated with a corresponding product module, within a UI window. In these and other embodiments, the lower the Config Score numeric value, the higher the ConfigRank priority. For example, a first product module that has a Config Score numeric value of '4' would have a higher ConfigRank priority than a second product module that has a Config Score numeric value of '7'. As a result, the product module descriptor associated with the first product module would have preferred placement over the product module descriptor associated with the second product module.

Figure 4:
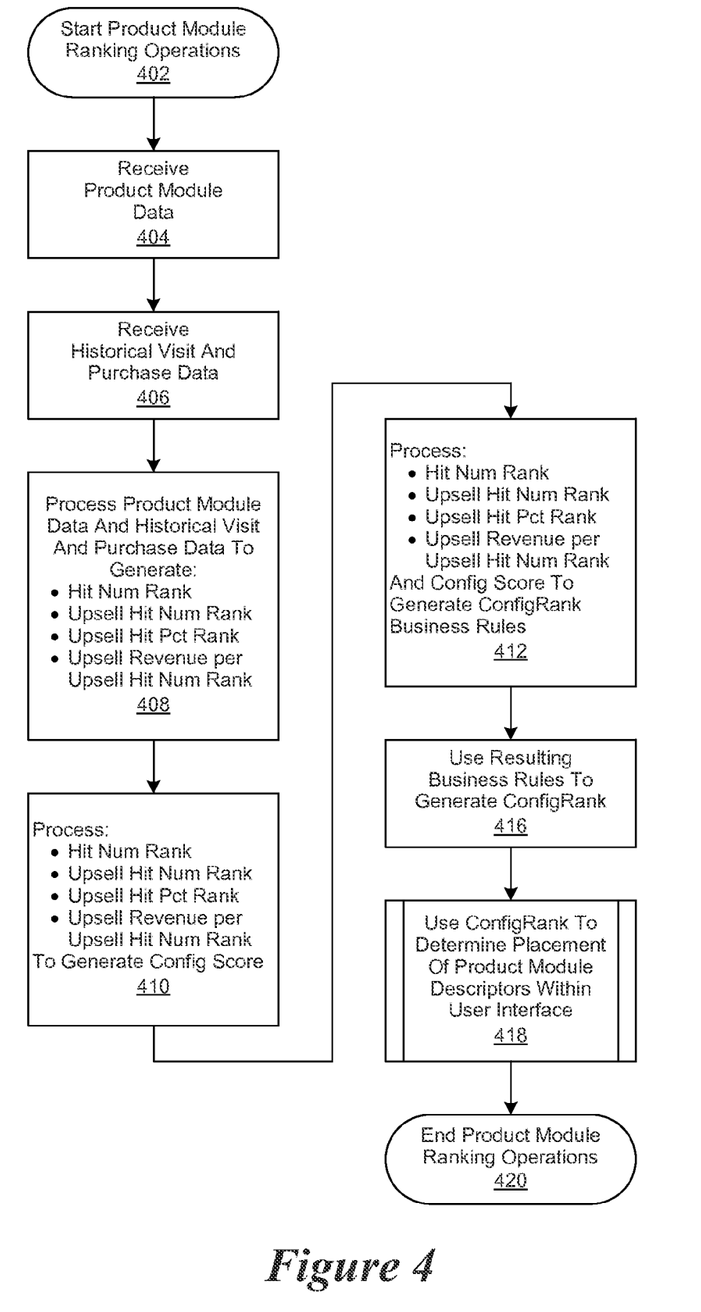
FIG. 4 is a generalized flowchart of the performance of ranking operations to display product module data in a ranked order within a user interface window.

FIG. 4 is a generalized flowchart of ranking operations performed in accordance with an embodiment of the invention to display product module descriptors in a ranked order within a user interface window. In this embodiment, product module ranking operations are begun in step 402, followed by the receipt of product module data in step 404. Historical site visit and product module purchase data is then received in step 406. In various embodiments, the historical site visit data comprise user clickstream data familiar to those of skill in the art. The product module data and the historical visit and product module purchase data is then processed in step 408 to generate a Hit Num Rank numeric value, an Upsell Hit Num Rank numeric value, an upsell Hit Pct Rank value, and an Upsell Revenue per Upsell Hit Num Rank numeric value as described in greater detail herein. The resulting Hit Num Rank, Upsell Hit Num Rank, upsell Hit Pct Rank, and Upsell Revenue per Upsell Hit Num Rank numeric values are then processed in step 410 to generate a Config Score numeric value, as likewise described in greater detail herein.

In turn, the Hit Num Rank, Upsell Hit Num Rank, upsell Hit Pct Rank, and Upsell Revenue per Upsell Hit Num Rank numeric values and the resulting Config Score numeric value are processed in step 412 to generate ConfigRank business rules, which are then used in step 416 to generate a ConfigRank numeric value. The ConfigRank numeric value is then used in step 418, as described in greater detail herein, to determine the placement of product module descriptors within a user interface (UI) window. Product module ranking operations are then ended in step 420.

Figure 5A:
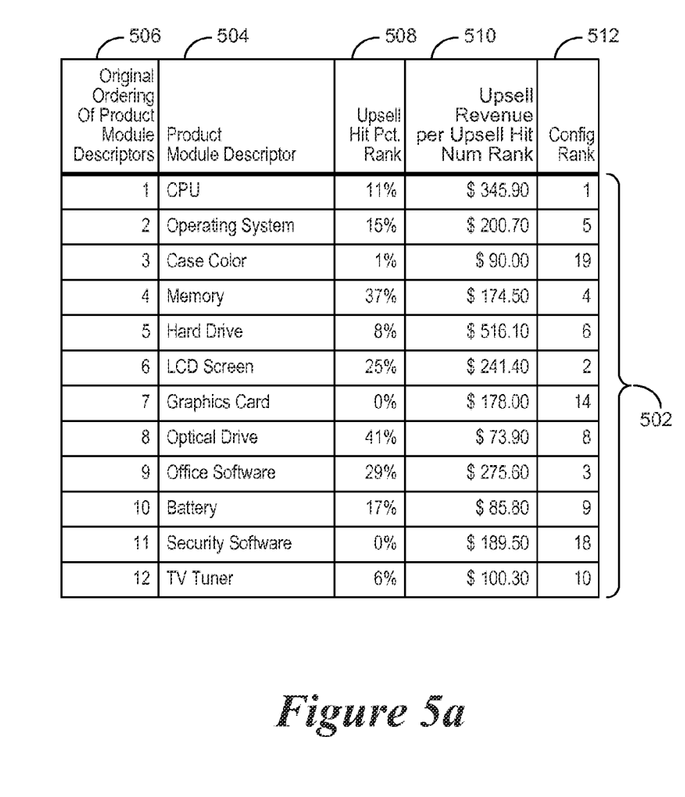
FIGS. 5a-b show a set of product modules reordered according to their respective ranking value.
Figure 5B:
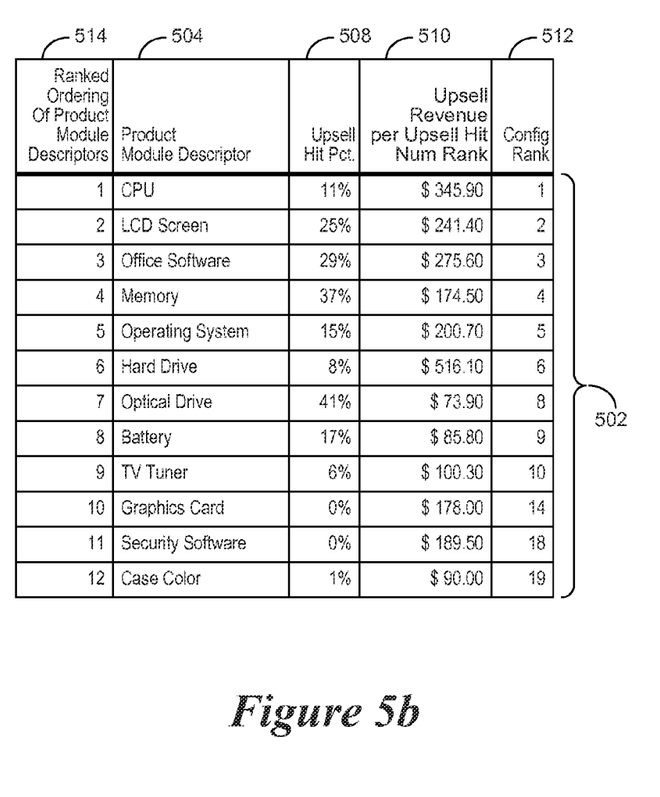

FIGS. 5a-b show a set of product modules reordered according to their respective ranking value, in accordance with an embodiment of the invention. As shown in FIG. 5a, a plurality of product modules 502 comprise an original ordering 506 of their associated product module descriptors 504, an Upsell Ht Pct. Rank 508, an Upsell Revenue per Upsell Hit Num Rank 510, and a ConfigRank numeric value 512. As described in greater detail herein, each product module's Config Rank numeric value 512 is used to perform product module ranking operations to determine the placement of each product module's 502 respective product module descriptors 504 within a user interface (UI) window. As shown in FIG. 5b, the use of the ConfigRank numeric value 512 has resulted in a ranked ordering 514 of the product module descriptors 504.

Figure 6A:
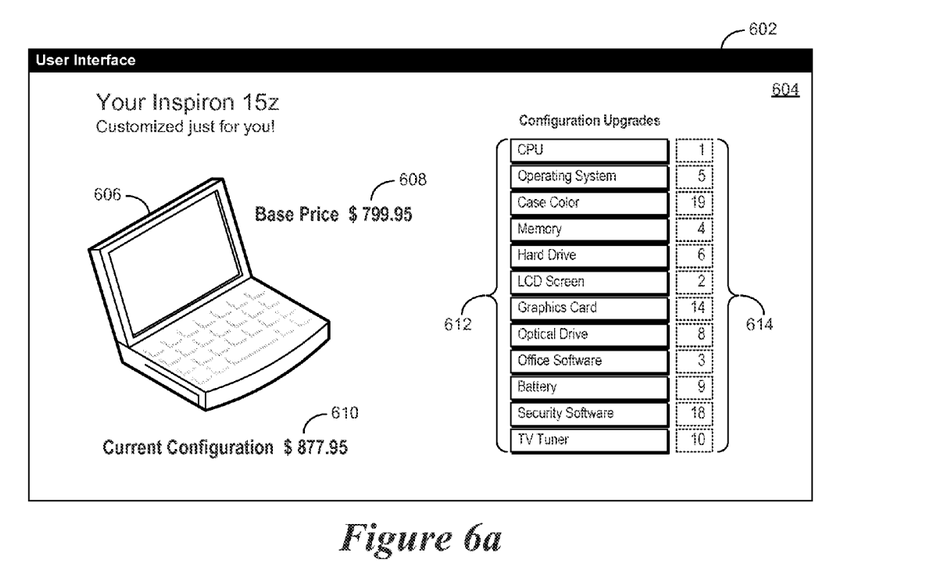
FIGS. 6a-b show a set of product module descriptors reordered within a user interface window according to the ranking value associated with their respective product modules.
Figure 6B:
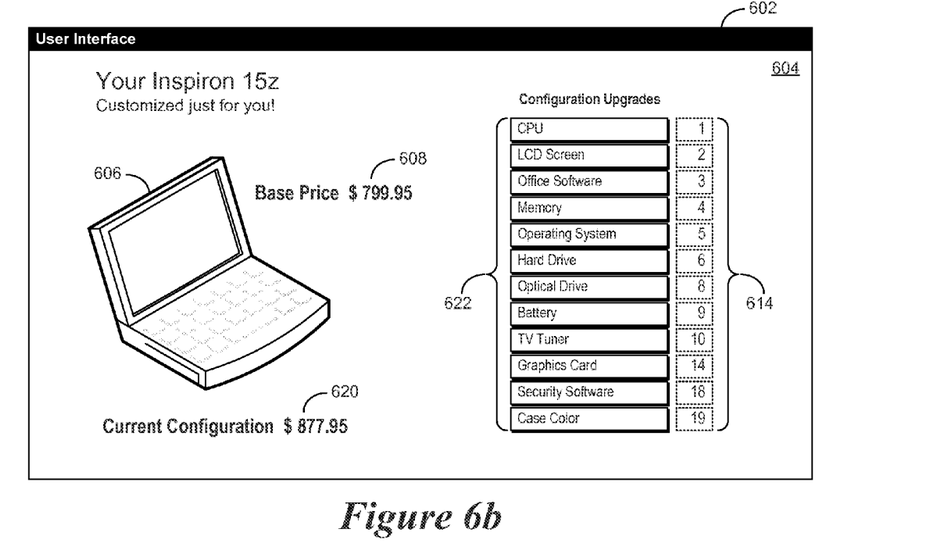

FIGS. 6a-b show a set of product module descriptors reordered within a user interface window according to the ranking value associated with their respective product modules, in accordance with an embodiment of the invention. In this embodiment, a user interface (UI) 602 comprises a UI window 604, which in turn comprises a product image, a "Base Price" 608 data field, a "Current Configuration" 610 data field, an original ordering 612 of a plurality of product module descriptors, and their associated ConfigRank numeric values 614. As described in greater detail herein, the associated ConfigRank numeric values 614 are used to determine the placement of the product module descriptors 612 within the user UI window 604, resulting in the ranked ordering of the product module descriptors 622 shown in FIG. 5b.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for managing display of product module descriptors within a user interface, comprising:

receiving a first set of location data to a product configurator system executing on a processor of an information handling system, the first set of location data comprising a first location of individual product module descriptors within a user interface window, each of the individual product module descriptors associated with a corresponding product module, the product module corresponding to an aspect of a product or service that can be applied to a default composition of a product, each of the individual product module descriptors comprising data to enable information about the product module to be represented within the user interface window;

processing user input data and product module purchase data via the product configuration system to generate a product module ranking value for each of the corresponding product modules, the product module ranking value comprising a numeric ranking value, the numeric ranking value corresponding to a value of revenue generated from a sale of a corresponding product module, the numeric ranking value being based upon product module data, historical visit data and product module purchase data for each of the corresponding product modules;

processing via the product configuration system the product module ranking value for each of the corresponding product modules to generate a second set of location data comprising a second location for each of the individual product module descriptors within the user interface window;

using the second set of location data to display the individual product module descriptors within the user interface window, the using the second set of location data reorders placement of the individual product module descriptors within the user interface within being based upon the product module ranking value for each of the corresponding product modules;

configuring the default configuration composition of the product to include at least one product module, the at least one product module corresponding to at least one individual product module descriptor displayed within the user interface window using the second set of location data, the product comprising a computer system; and, fabricating the computer system to include the at least one product module.

2. The method of claim 1, wherein:

the first set of location data is used to display the individual product module descriptors in a first list comprising a first product module descriptor listing order; and the second set of location data is used to display the individual product module descriptors in a second list comprising a second product module descriptor listing order.

3. The method of claim 1, wherein the user input data comprises:

a Hit Num Rank numeric value comprising the total number of user interactions with an individual product module descriptor; and a Upsell Hit Num Rank numeric value comprising the total number of user interactions with the individual product module descriptor that results in the purchase of its corresponding product module.

4. The method of claim 3, wherein an Upsell Hit Pct. Rank numeric value is generated by dividing the Upsell Hit Num Rank numeric value by the Hit Num Rank numeric value.

5. The method of claim 4, wherein:

the product module purchase data comprises the total revenue generated by the purchase of the corresponding product module; and an Upsell Revenue per Upsell Hit Num Rank numeric value is generated by dividing the total revenue by the Upsell Hit Num Rank.

6. The method of claim 5, wherein the product module ranking value for each of the corresponding product modules comprises the sum of its associated:

Hit Num Rank numeric value;

Upsell Hit Num Rank numeric value;

Upsell Hit Pct. Rank numeric value; and

Upsell Revenue per Upsell Hit Num Rank numeric value.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

receiving a first set of location data to a product configurator system executing on the processor of the system, the first set of location data comprising a first location of individual product module descriptors within a user interface window, each of the individual product module descriptors associated with a corresponding product module, the product module corresponding to an aspect of a product or service that can be applied to a default composition of a product, each of the individual product module descriptors comprising data to enable information about the product module to be represented within the user interface window;

processing via the product configuration system user input data and product module purchase data to generate a product module ranking value for each of the corresponding product modules, the product module ranking value comprising a numeric ranking value, the numeric ranking value corresponding to a value of revenue generated from a sale of a corresponding product module, the numeric ranking value being based upon product module data, historical visit data and product module purchase data for each of the corresponding product modules;

processing via the product configuration system the product module ranking value for each of the corresponding product modules to generate a second set of location data comprising a second location for each of the individual product module descriptors within the user interface window;

using the second set of location data to display the individual product module descriptors within the user interface window, the using the second set of location data reorders placement of the individual product module descriptors within the user interface within being based upon the product module ranking value for each of the corresponding product modules;

configuring the default configuration composition of the product to include at least one product module, the at least one product module corresponding to at least one individual product module descriptor displayed within the user interface window using the second set of location data, the product comprising a computer system; and, fabricating the computer system to include the at least one product module.

8. The system of claim 7, wherein:
the first set of location data is used to display the individual product module descriptors in a first list comprising a first product module descriptor listing order; and
the second set of location data is used to display the individual product module descriptors in a second list comprising a second product module descriptor listing order.

9. The system of claim 7, the user input data comprises:
a Hit Num Rank numeric value comprising the total number of user interactions with an individual product module descriptor; and
a Upsell Hit Num Rank numeric value comprising the total number of user interactions with the individual product module descriptor that results in the purchase of its corresponding product module.

10. The system of claim 9, wherein an Upsell Hit Pct. Rank numeric value is generated by dividing the Upsell Hit Num Rank numeric value by the Hit Num Rank numeric value.

11. The system of claim 10, wherein:
the product module purchase data comprises the total revenue generated by the purchase of the corresponding product module; and
an Upsell Revenue per Upsell Hit Num Rank numeric value is generated by dividing the total revenue by the Upsell Hit Num Rank.

12. The system of claim 11, wherein the product module ranking value for each of the corresponding product modules comprises the sum of its associated:
Hit Num Rank numeric value;
Upsell Hit Num Rank numeric value;
Upsell Hit Pct. Rank numeric value; and
Upsell Revenue per Upsell Hit Num Rank numeric value.

13. A non-transitory, computer-readable storage medium embodying computer program code, the computer program code comprising computer executable instructions configured for:

receiving a first set of location data to a product configurator system executing on a processor of an information handling system, the first set of location data comprising a first location of individual product module descriptors within a user interface window, each of the individual product module descriptors associated with a corresponding product module, the product module corresponding to an aspect of a product or service that can be applied to a default composition of a product, each of the individual product module descriptors comprising data to enable information about the product module to be represented within the user interface window;

processing via the product configuration system user input data and product module purchase data to generate a product module ranking value for each of the corresponding product modules, the product module ranking value comprising a numeric ranking value, the numeric ranking value corresponding to a value of revenue generated from a sale of a corresponding product module, the numeric ranking value being based upon product module data, historical visit data and product module purchase data for each of the corresponding product modules;

processing via the product configuration system the product module ranking value for each of the corresponding product modules to generate a second set of location data comprising a second location for each of the individual product module descriptors within the user interface window;

using the second set of location data to display the individual product module descriptors within the user interface window, the using the second set of location data reorders placement of the individual product module descriptors within the user interface within being based upon the product module ranking value for each of the corresponding product modules;

configuring the default configuration composition of the product to include at least one product module, the at least one product module corresponding to at least one individual product module descriptor displayed within the user interface window using the second set of location data, the product comprising a computer system; and, fabricating the computer system to include the at least one product module.

14. The non-transitory, computer-readable storage medium of claim 13, wherein:
the first set of location data is used to display the individual product module descriptors in a first list comprising a first product module descriptor listing order; and
the second set of location data is used to display the individual product module descriptors in a second list comprising a second product module descriptor listing order.

15. The non-transitory, computer-readable storage medium of claim 13, wherein the user input data comprises:
a Hit Num Rank numeric value comprising the total number of user interactions with an individual product module descriptor; and
a Upsell Hit Num Rank numeric value comprising the total number of user interactions with the individual product module descriptor that results in the purchase of its corresponding product module.

16. The non-transitory, computer-readable storage medium of claim 15, wherein an Upsell Hit Pct. Rank numeric value is generated by dividing the Upsell Hit Num Rank numeric value by the Hit Num Rank numeric value.

17. The non-transitory, computer-readable storage medium of claim 16, wherein:
the product module purchase data comprises the total revenue generated by the purchase of the corresponding product module; and
an Upsell Revenue per Upsell Hit Num Rank numeric value is generated by dividing the total revenue by the Upsell Hit Num Rank.

18. The non-transitory, computer-readable storage medium of claim 17, wherein the product module ranking value for each of the corresponding product modules comprises the sum of its associated:
    Hit Num Rank numeric value;
    Upsell Hit Num Rank numeric value;
    Upsell Hit Pct. Rank numeric value; and
    Upsell Revenue per Upsell Hit Num Rank numeric value.

* * * * *